Sept. 18, 1956 R. F. THOMSON 2,763,519
POWDERED METAL BEARING
Filed July 19, 1952

Inventor
Robert F. Thomson
By Willits, Helmig & Baillio
Attorneys

United States Patent Office 2,763,519
Patented Sept. 18, 1956

2,763,519

POWDERED METAL BEARING

Robert F. Thomson, Ecorse, Mich., assignor to General Motors Corporation, Detroit, Mich., a corporation of Delaware Application July 19, 1952, Serial No. 299,783

9 Claims. (Cl. 308—240)

This invention relates to bearings and particularly to thrust bearings and the like formed from sintered metal powders.

A principal object of the present invention is to provide a novel thrust bearing made from sintered metal powder in which the bearing portion thereof has higher porosity and better frictional characteristics than adjacent portions.

A further object of this invention is to provide a process for forming a unitary thrust bearing which is adapted to be attached to a machine member which has a bearing portion of an anti-friction material of porous powdered metal and attaching lugs having strength and ductility approaching that of wrought steel.

These and other objects are attained in accordance with my invention by a sintered powdered metal briquette in which the bearing portion is permitted to remain highly porous and capable of retaining oil while attaching portions are forged to high density and are thereby provided with increased strength and ductility.

Other objects and advantages of the present invention will more fully appear from the following detailed description of a preferred embodiment of my invention shown in the accompanying drawing, in which.

Figure 3:
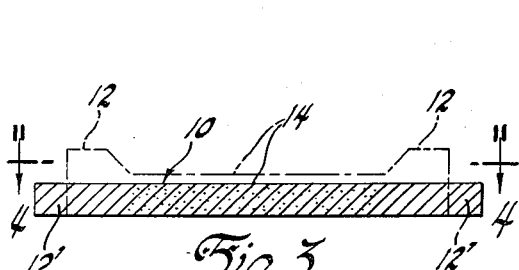
Figure 3 is a longitudinal sectional view of the sintered briquette shown in Figures 1 and 2 after it has been subjected to a forging operation, the broken lines indicating the shape of the sintered briquette before forging.
Figure 4:
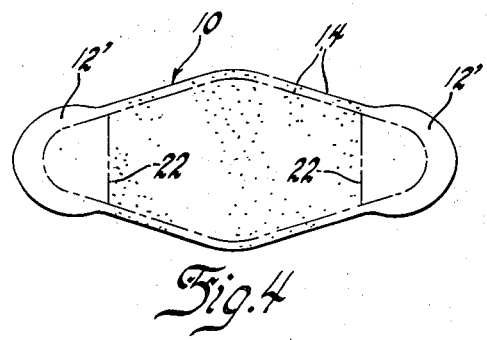
Figure 5:
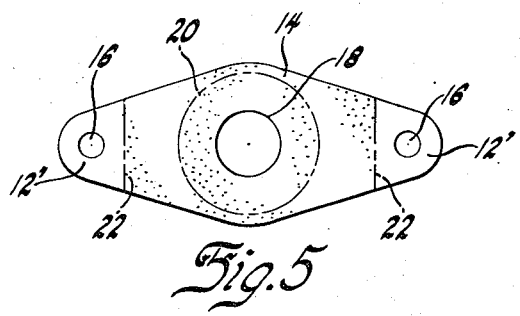

Figure 4 is a plan view of the sintered and forged powdered metal briquette shown in Figure 3, the broken lines indicating generally both the shape of the sintered briquette before forging and the outline of the finished bearing; and Figure 5 is a plan view of the completed thrust bearing formed in accordance with the present invention, the broken lines differentiating the porous bearing area from the stronger and denser attaching lugs and indicating the position of the end of a shaft in contact with the bearing area.

Porous metal thrust bearings have been commonly used in industry during recent years. Heretofore, however, all of these bearings have either been of uniform strength and porosity or else have had differential strength areas provided by the localized addition of particular powdered metal constituents. Furthermore, such bearings have proved to be inadequate for applications in which it is required that they be bolted or screwed to a machine member by means of attaching lugs. In these instances, either the antifriction bearing material had unsatisfactory bearing properties or the lug portions of the bearing did not possess sufficient strength and ductility to prevent fracture of the lugs under severe operating conditions.

Figure 1:
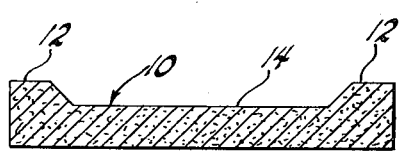
Figure 1 is a longitudinal sectional view along the line 1—1 of Figure 2 showing a sintered powdered metal briquette for use in one embodiment of my invention.
Figure 2:
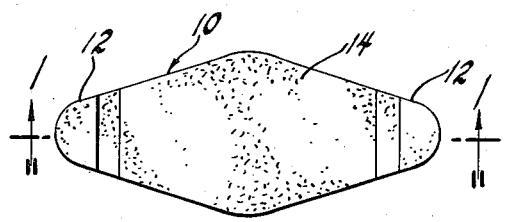
Figure 2 is a plan view of the sintered briquette shown in Figure 1.

Referring more particularly to the drawing, in Figures 1 and 2 is shown a sintered powdered metal briquette, indicated generally by 10, having a shape permitting a thrust bearing to be formed in accordance with my invention. This briquette is provided with upraised end portions 12 from which attaching lugs are to be fashioned and a central recessed or thinner bearing area 14. Both the bearing area 14 and the upraised end portions 12 are formed of a powdered metal having adequate bearing properties.

The thrust bearing may be prepared by briquetting metal powder at an appropriate pressure, preferably between 20,000 and 120,000 pounds per square inch, in a die having a contour which is complementary to the surface desired, thereby providing the briquette with a configuration similar to that shown in Figures 1 and 2. The green briquette is then sintered under suitable conditions of time, temperature and atmosphere into a sintered metal object having a controlled degree of porosity. Where powdered iron is the principal constituent, sintering temperatures between 1900° F. and 2300° F. have proved to be particularly satisfactory.

After sintering, the briquette is forged into a generally flat bearing plate, as shown in Figures 3 and 4. The forging operation is preferably one of hot forging, and it is usually expedient to forge the briquette before it has cooled after the sintering step. If desired, of course, the briquette may be permitted to cool and then reheated to an appropriate temperature for forging. Forging temperatures approaching those used for briquetting are generally suitable for use in forming the present bearing. In order to obtain particular bearing properties, however, it is frequently permissible to cold forge the briquette, but generally hot forging operations are preferable.

As best shown in Figure 3, the thickness of the original generally flat central bearing portion 14 of the briquette has been reduced only slightly as a result of the forging operation, while the upraised end or lug portions 12 of the briquette have been greatly reduced in thickness, their original, relatively thick shapes being forged to the same general thickness as the remainder of the bearing plate. The amount of forging is carefully controlled, of course, and the resultant compression of the porous metal at the raised lug portions reduces the porosity thereof to a considerably greater extent than at the central depressed bearing portion. In some instances, moreover, it may be desirable not to forge the bearing portion at all.

As a result of the above-described forging operation, the formed lug or attaching portions, which constitute no part of the bearing surface, become considerably stronger and more ductile than the relatively porous bearing area of the thrust bearing. In fact, I have found that the density, strength and ductility of the attaching lugs can be made to approach that of wrought steel.

It will be appreciated, of course, that it is not necessary in all instances to form the lug and bearing portions of equal thickness, as shown in Figures 3 through 5. In order to obtain optimum results, however, it is essential that the proper differential with respect to certain physical characteristics, such as density and ductility, be created between the relatively porous bearing area and the dense and ductile lug portions of the powdered metal bearing.

After the briquette 10 has been forged into the shape shown in Figures 3 and 4, approximate openings may be drilled and the formed bearing machined to final dimensions, as shown in Figure 5. For example, openings 16 may be provided in the now flat lug portions 12′, as shown in Figure 5, these openings being suitable to receive bolts or screws for attaching the bearing to a machine member. A larger opening 18 is shown as formed in a central bearing area of the thrust bearing to accommodate a reduced diameter pilot end portion of a shaft having a bearing shoulder which rotatably bears against the thrust bearing. The broken line 20 indicates the outer diameter of such a shaft, while the broken lines 22 are used in Figures 4 and 5 to differentiate between the porous bearing area 14 and the strong, dense and ductile attaching lug portions 12'.

Excellent results have been obtained in accordance with my invention by the use of an iron powder mix comprising 1% to 3% graphite, 1% to 10% of an intermediate alloy of nickel-titanium, and the balance substantially all iron. More specifically, an iron powder mix consisting of 5% nickel-titanium alloy, 2% graphite and 93% iron powder has proved to be particularly satisfactory. The nickel-titanium alloy used in powdered form in accordance with my invention is preferably composed of 40% to 90% nickel and 10% to 60% titanium.

For particular applications it may be desirable to eliminate the hardening powdered constituent, such as the above nickel-titanium alloy, from the attaching lug areas in the interest of obtaining particular physical properties at these areas. Of course, other powdered metal constituents may be added to the appropriate bearing or attaching areas of the thrust bearing to obtain the physical characteristics desired.

It will be understood that the thrust bearing shown herein may be manufactured under the usual porous metal techniques as disclosed in a number of patents, such as Patents Nos. 1,738,163, 2,097,671, 2,075,444, etc. It is also obvious that the bearing may be formed from materials other than powdered iron. For example, copper, tin, iron partially impregnated with copper or any other suitable material, or mixtures of copper and tin may be used. In practice, many bearings are made from bronze materials which may be formed by either sintering together copper-tin powder, as disclosed in the aforementioned patents, or by sintering together pre-alloyed types of powder such as is disclosed in Olt Patent No. 2,273,589. Also, instead of briquetting the metal powder as hereinbefore explained, it may be molded to shape as suggested in Koehring Patent No. 2,198,702, in which event the forging operation, as before, increases the density of the attaching or lug portions of the thrust bearing. All of these modifications are understood to be within the scope of the present invention, which broadly comprehends the use of a thrust bearing member having a porous bearing area and a strong, ductile and dense attaching portion.

While the present invention has been described by means of the particular embodiment disclosed, it is to be understood that other forms might be adopted and are contemplated as being within the scope of the present invention as set forth in the appended claims.

I claim:

1. A unitary sintered powdered metal thrust bearing comprising a porous portion adapted to engage a movable member, and an integral attaching portion forged to a density and ductility greater than the porous portion, said bearing being formed from an iron powder mix comprising approximately 1% to 3% graphite, 1% to 10% of an intermediate alloy of nickel and titanium and the balance substantially all iron.

2. The thrust bearing set forth in claim 1 in which the intermediate alloy consists essentially of 40% to 90% nickel and 10% to 60% titanium.

3. A one-piece sintered powdered metal thrust bearing comprising a generally central, substantially flat porous oil-retaining bearing portion and a heavily forged, non-bearing lug portion of greater density and ductility than said bearing portion located on each side thereof and generally coplanar therewith, each of said lug portions having an opening provided therethrough adapted to receive a fastening element for attachment of said thrust bearing to a supporting surface.

4. A sintered powdered metal bearing comprising a porous portion adapted to engage a movable member, and an attaching portion integral with said porous portion and forged to a density and ductility greater than the porous portion, said bearing being formed from a powder iron mix containing a small proportion of hard particles of a nickel-titanium alloy.

5. A sintered powdered metal bearing comprising a generally central oil-retaining bearing portion and a heavily forged lug portion of greater density and ductility than said bearing portion integral with said bearing portion and located on each side thereof, each of said lug portions being adapted to receive a fastener element for attachment of said bearing to a supporting surface, said bearing being formed from a powdered iron mix containing 1% to 10% by weight of hard particles of a nickel-titanium intermetallic compound.

6. A sintered powdered metal bearing comprising a porous oil-retaining bearing portion and a heavily forged, non-bearing lug portion of greater density and ductility than said bearing portion and integral therewith, said lug portion having an opening extending therethrough to receive a fastening member for attachment of said bearing to a supporting surface.

7. The process of forming a powdered iron bearing which comprises compressing a powdered iron mixture into a briquette having a generally flat bearing portion and a plurality of adjacent upraised attaching portions, said mixture comprising 1% to 3% graphite, 1% to 10% wear-resistant particles of an intermediate alloy consisting essentially of nickel and titanium, and the balance substantially all iron, subsequently sintering said briquette at a temperature of 1900° F. to 2300° F., and thereafter differentially forging said briquette so that the upraised portions are forged to a greater extent than said bearing portion.

8. The process of forming a bearing member which comprises briquetting a powdered metal mix which is composed principally of iron at a pressure between 20,000 pounds per square inch and 120,000 pounds per square inch into a shape having a bearing portion and an attaching portion, sintering the formed briquette at a temperature of 1900° F. to 2300° F., and thereafter compressing the attaching portion of said sintered briquette to a greater extent than said bearing portion to provide the attaching portion with higher densiy and ductility and the bearing portion with high porosity.

9. The process set forth in claim 8 in which the powdered metal mix contains 1% to 3% graphite and 1% to 10% wear-resistant particles of an alloy consisting essentially of nickel and titanium in which the nickel constitutes between 40% and 90% of said alloy.

References Cited in the file of this patent

UNITED STATES PATENTS

| 1,679,408 | Davis et al. | Aug. 7, 1928 |
| 2,084,756 | Albrecht | June 22, 1937 |
| 2,156,802 | Cooper | May 2, 1939 |
| 2,168,227 | Lignian | Aug. 1, 1939 |
| 2,206,395 | Gertler | July 2, 1940 |
| 2,225,269 | Hildabolt | Dec. 17, 1940 |
| 2,331,909 | Hensel et al. | Oct. 19, 1943 |
| 2,615,766 | Wallace | Oct. 28, 1952 |

FOREIGN PATENTS

| 6,554 | Great Britain | 1907 |
| 689,556 | France | Sept. 9, 1930 |

OTHER REFERENCES

Product Engineering, March 1950, outside back cover.